United States Patent

Aaland

[15] 3,656,128

[45] Apr. 11, 1972

[54] MAGNETIC MATRIX RECORDING SYSTEM

[72] Inventor: Kristian Aaland, Livermore, Calif.

[73] Assignee: The United States of America as represented by the United States Atomic Energy Commission

[22] Filed: Dec. 22, 1970

[21] Appl. No.: 100,740

[52] U.S. Cl...............340/174 AN, 340/174 M, 340/174 TF, 340/174 VB

[51] Int. Cl...................G11c 27/00, G11c 11/14, G11c 5/02

[58] Field of Search.................340/174 AN, 174 M, 174 VB, 340/174 TF

[56] References Cited

UNITED STATES PATENTS

| | | | |
|---|---|---|---|
| 3,457,554 | 7/1969 | White et al. | 340/174 VB |
| 3,414,890 | 12/1968 | Schwartz | 340/174 VB |
| 3,408,639 | 10/1968 | Nakamara | 340/174 VB |
| 3,274,570 | 9/1966 | Brekne | 340/174 M |
| 3,196,413 | 7/1965 | Teig | 340/174 M |

OTHER PUBLICATIONS

IBM Technical Disclosure Bulletin, " Magnetic Memory" by Schlaeppé, Vol. 7, No. 1, 6/64 pages 85–86

*Primary Examiner*—Stanley M. Urynowicz, Jr.
*Attorney*—Roland A. Anderson

[57] ABSTRACT

A magnetic matrix recording and storage system in which an array of thin-film magnetic memories is utilized to record electrical signals as a function of time. In general, for example, one axis of a magnetic matrix card (i.e., an array of magnetic bit memories) provides a time base wherein each column or word line is sequentially periodically excited. The remaining axis concurrently records in threshold steps the magnitude of a signal, thereby providing a magnetically stored plot of the signal as a function of time. The magnetic matrix system may be used, for example, to provide the equivalent of an oscilloscope-camera combination for the recording of a time-varying signal, where the waveform of the signal is traced out as the boundary between regions of the two stable states of magnetization possible in the film. The magnetic matrix system may utilize, instead of cards or ribbons, parallel wires, each plated with a magnetic thin film and wrapped with coils of wire which provide the bias and signal fields. Readout of the magnetic matrix recording system may, for example, be accomplished by magneto-optical means or electronically.

10 Claims, 11 Drawing Figures

INVENTOR.
Kristian Aaland
BY
ATTORNEY.

Patented April 11, 1972 3,656,128

5 Sheets-Sheet 2

INVENTOR.
Kristian Aaland
BY

ATTORNEY.

INVENTOR.
Kristian Aaland
BY
Roland A. Anderson
ATTORNEY

Patented April 11, 1972
3,656,128
5 Sheets-Sheet 4

INVENTOR.
Kristian Aaland
BY
[signature]
ATTORNEY.

INVENTOR.
Kristian Aaland
BY
[signature]
ATTORNEY.

MAGNETIC MATRIX RECORDING SYSTEM

BACKGROUND OF THE INVENTION

The invention described herein was made in the course of, or under, Contract No. W-7405-Eng-48, with the United States Atomic Energy Commission.

The invention relates to recording and storage systems, and more particularly to a system for analyzing electrical signals in which a magnetic matrix memory is used as a recording and storage analogue element.

Magnetic thin films have in recent years become widely utilized. For example, a magnetic thin film device which records the peak value and the polarity of a pulse is exemplified by U.S. Pat. No. 3,480,921 issued to Robert P. Matthews et al.

SUMMARY OF THE INVENTION

The present invention is directed to a system for analyzing electrical signals in which a magnetic matrix memory is used as a recording and storage analogue element. More specifically, the invention comprises a magnetic memory array, means for sequentially pulsing each column or word line of the array, means for differentially biasing each row or digit line of the array, and means for applying an input signal into each digit line. This circuitry provides a signal recording device with a time base oriented parallel with the digit lines of the memory and a threshold amplitude scale coextensive with the word lines of the array. The highest order memory bits switched on each word line is an approximate measure of the instantaneous amplitude of the input pulse during the time interval when the word line is pulsed through a delay line network. The highest order memory bits switched along the digit line represents an approximate record of the amplitude time profile of the pulse, which may be rendered arbitrarily accurate, within practical limits, by increasing the number of digit lines and word lines. The invention provides a magnetic matrix recording system which utilizes magnetic thin film memory elements in the form of lines on a continuous surface, or strips of magnetic film, an array of plated wires, and an array of small, separated area dots of magnetic film. The system may be utilized, for example, as a planar oscilloscope.

Therefore, it is an object of this invention to provide a magnetic matrix recording system.

A further object of the invention is to provide a magnetic matrix recording system in which an array of thin-film magnetic memories is utilized to record electrical signals as a function of time.

Another object of the invention is to provide a system for analyzing electrical signals in which a magnetic matrix memory is used as a recording and storage analogue element.

Another object of the invention is to provide a recording and storage system which utilizes a magnetic memory array, means for sequentially pulsing each column or word line of the array, means for differentially biasing each row or digit line of the array, and means for applying an input signal to each digit line.

Another object of the invention is to provide a magnetic matrix recording system which is based on the uniaxial anisotropy of magnetic thin film which makes possible the tracing out of a time-varying signal as a record in the film, the trace existing in two dimensional form.

Another object of the invention is to provide a magnetic matrix recording system having the ability to record single transients at extremely high speeds, relatively high resistance to nuclear radiation, compactness, economy due to re-usability of the magnetic film, and choice of readout modes which are inherently non-destructive, although the recording can be erased.

Another object of the invention is to provide a magnetic matrix recording and storage system which can effectively function as a memory oscilloscope, chart recorder, etc.

Other objects of the invention will become readily apparent from the following description and accompanying drawings.

DESCRIPTION OF THE INVENTION

Figure 1:
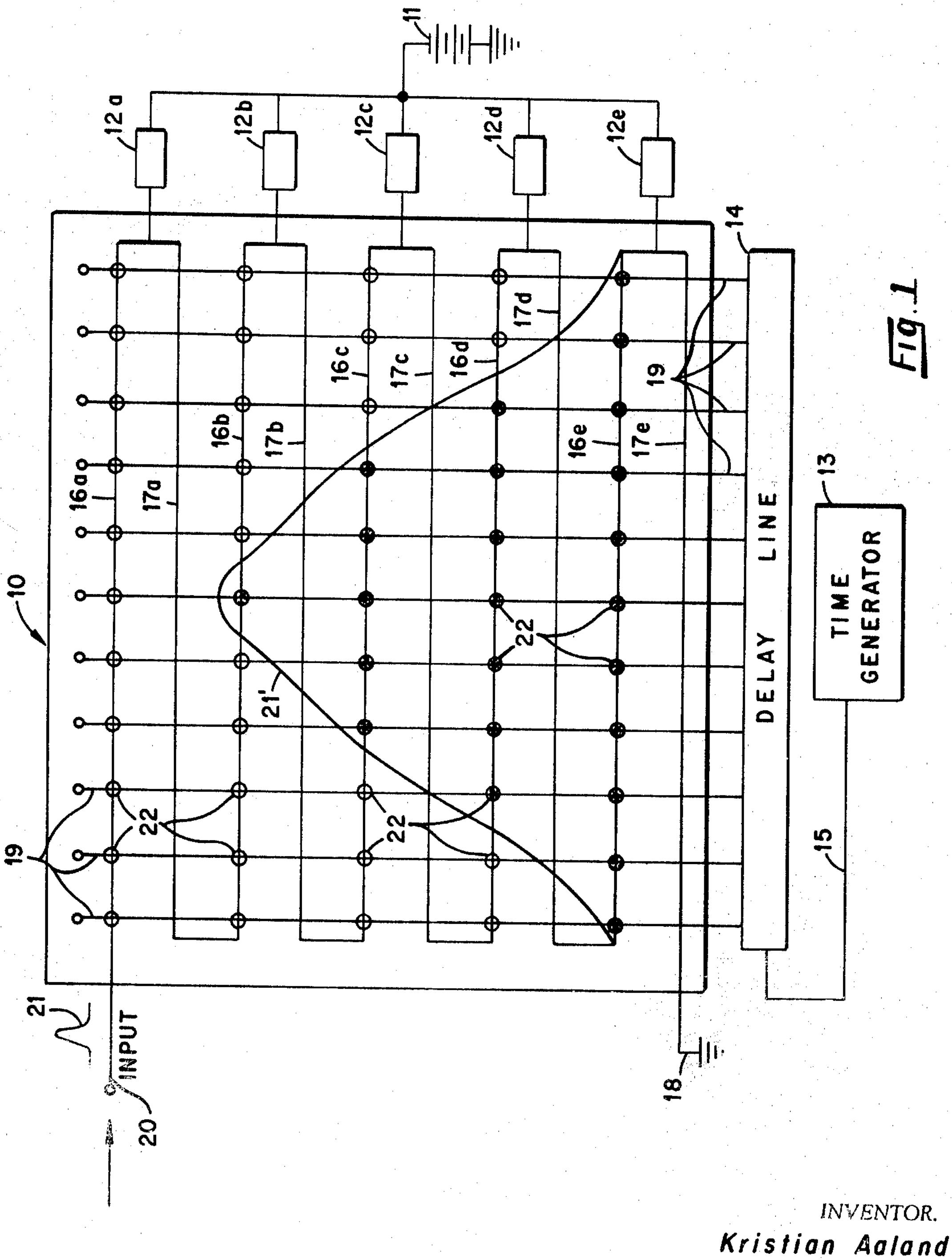
FIG. 1 is a view of an embodiment which schematically illustrates the inventive magnetic matrix recording system.

FIG. 1 schematically illustrates the inventive magnetic matrix recording system and comprises a magnetic matrix card 10, supporting preferably a multitude of individual thin film memories or bits, in conjunction with biasing means comprised of a bias power source 11 and current-bias impedance means **12*a* – 12*e*, and time sequence current-pulsing means comprised of a time trigger generator 13 and a delay line network 14 operatively connected to generator 13 as indicated by lead 15 as known in the art. Other ways to strobe (time sequence current-pulsing) are known in the art and may be utilized if desired. Matrix card 10 is provided with a plurality of parallel digit lines 16*a* – 16*e* which are series interconnected by return lines 17*a* – 17*e* with return line 17*e* being connected to ground as indicated at 18, although other methods are known in the art and may be utilized if desired. Matrix card 10 is also provided with a plurality of parallel word lines 19 perpendicular to digit lines 16*a* – 16*e* and operatively connected to delay line network 14. Bias impedance means 12*a* – 12*e* are respectively connected to digit lines 16*a* – 16*e* to oppose current flow therethrough as described in greater detail hereinafter. Each of bias impedance means 12*a* – 12*e* is selected to provide an approximate steady state current in digit lines 16*a* – 16*e* such that the required digit line switching current decreases consecutively from line 16*a* respectively through line 16*e*. Other means for biasing are known in the art and the method described herein is not intended to be limiting but exemplary. Delay line network 14 is selected to have a wave propagation time equal to a desired spread of the time base. With each word line 19 periodically attached to delay line 14, as described above, a pulse initiated in network 14 will sequentially current drive lines 19 at predetermined time intervals within the predetermined time spread. An input line 20 adapted to carry an input signal 21 is connected to digit line 16*a*. While input line 20 is shown connected to only digit line 16*a* such that an input signal thereon is directed in a continuous electrical path via digit lines 16*a* – 16*e* and return lines 17*a* – 17*e* to ground 18, a strip similar to that described hereinafter with respect to FIG. 5 may be utilized whereby an input signal or signals may be initially directed through any of the digit lines 16*a* – 16*e* to ground. A magnetic memory bit or element 22 (small individual area of thin magnetic film) is formed at each intersection of digit lines 16*a* – 16*e* with word lines 19. Note that in the FIG. 1 embodiment no memory bit or element 22 is formed at the intersection of return lines 17*a* – 17*e* and word lines 19. As pointed out above, and as will be described in greater detail hereafter with respect to the description of the FIGS. 2–6** embodiment, the inventive system is based on the uniaxial anisotropy of magnetic thin film which makes possible the tracing out of a time-varying signal as a record in the film, the trace actually existing in two dimensional form.

In operation of the FIG. 1 embodiment, an input pulse 21 is applied to digit line 16a via input line 20. Concurrently therewith, a timing strobe pulse is initiated in delay line network 14 by means of generator 13, as known in the art. In accordance with the operation of thin film magnetic memories, based on film anisotrophy, a memory bit or element 22 switches only upon the concurrence of excitation currents in both the word line 19 and digit line 16 (16*a* – 16*e*). Upon a decay of the currents in word lines 19 switching direction is governed by an extremely small amplitude of bit current direction. Therefore, only those bits 22 which have current direction of the signal, digit line (16*a* – 16*e*), at the particular time at which the associated word line 19 is decaying will switch state. Since the biasing means (12*a* – 12*e*) provides current opposite to signal current that is consecutively decreasing from digit line 16*a* through digit line 16*e*, the amplitude of the signal 21 is differentially recorded in memory bits 22 along the word lines 19. The signal function with time is recorded in memory bits 22 with the time axis oriented along digit lines 16*a* – 16*e*. On completion of the recording sequence, the signal 21' is plotted and stored on card 10 in terms of switched memory bits 22, illustrated by the shaded bits 22 within the curve plot as indicated at 21'. The plot 21' being drawn between those bits 22 which have been switched and those which have not. Readout equipment similar to conventional types may be used to recover the stored information, example of such conventional readout equipment is the magneto-optical or electronic means which do not constitute part of this invention and thus not described in further detail.

While only a single matrix card 10 has been illustrated in FIG. 1, a plurality of such recording cards may be stacked in parallel or in series to provide an extended time and signal amplitude range. Also, the biasing power supply and the pulse generator may be disposed at a distance from the recording card and connected thereto by appropriate cables, thereby permitting field emplacement of the recording device near the signal source, such arrangement being particularly useful for the recording of signals generated by particle detectors during a nuclear detonation.

To more fully describe the invention and to illustrate practical applications of the novel magnetic matrix recording system, the following discussion and embodiment illustrations are provided.

A magnetic matrix card, made in accordance with the invention, can be utilized to provide the equivalent of an oscilloscope-camera combination for the recording of a time-varying signal. The wave-form of the signal is traced out as the boundary between regions of the two stable states of magnetization possible in the film, as described more fully hereinafter.

As pointed out above, the basic phenomenon used is the uniaxial anisotropy property of magnetic thin films (such as Permalloy, a non-magnetostrictive material of 81–19 nickel-iron percentage, deposited as a film on a planar substrate). The magnetic film is composed of many domains, which respond to current as if they were a tiny magnet. However, the film is magnetically anisotropic. This means that when all exciting current is removed, the domain will return to an "easy" axis. This preferred direction, or "easy" axis, of magnetization is fixed in the film by applying a steady magnetic field in that direction during deposition. When current is applied in the proper direction, the domains can be rotated 90° to the "-hard" axis, this current being called the "word" current (current through word lines 19 in FIG. 1). The hard axis orientation is unstable when the exciting current (word current) is removed, and the domain will return to one of the easy axis directions. The "easy" direction to which the domain returns may be determined by a current which tilts the domain off the hard axis toward one or the other easy axis, this current being called the "digit" current (current through digit lines 16*a* – 16*e* in FIG. 1). The digit current represents the signal to be recorded. When the word current stops or decays the domain then falls to the easy direction determined by the digit current direction, be it positive or negative. It is the changes in easy axis direction due to the small digit current which enables the magnetic film to act as a recorder. Thus, even though the electron spins have been oriented in one specific direction originally, they do not retain any polarity preference as to which direction they should relax along the easy axis.

Figure 2:
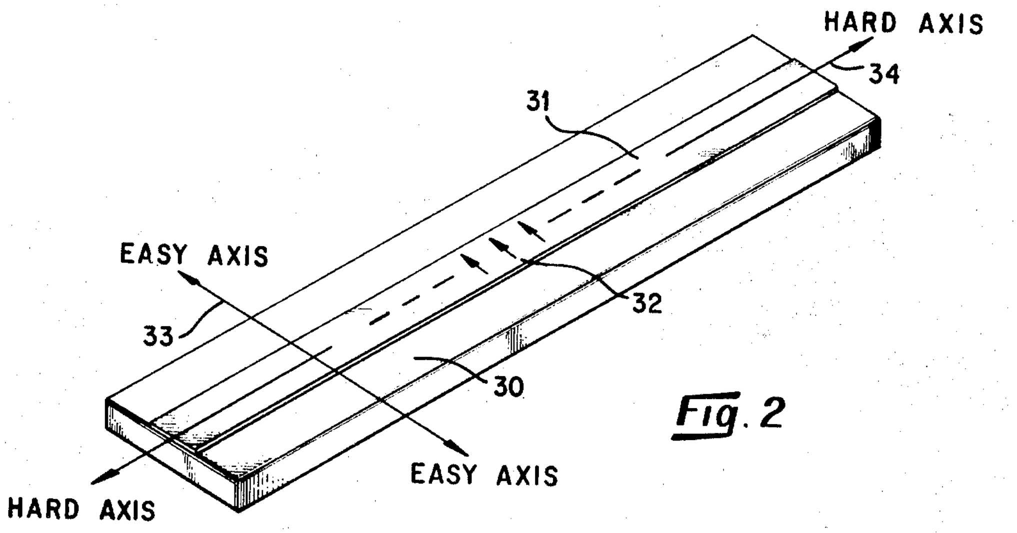
FIGS. 2–6 are views illustrating another embodiment of the invention adapted for use as a planar oscilloscope.

When the magnetic film is deposited on a substrate, as pointed out above, a field is applied which aligns all the domains so their easy axes point in the same direction as illustrated in FIG. 2 which shows a substrate 30 with a ribbon of thin magnetic film 31 deposited thereon. The magnetization or domains, indicated by the arrows at 32, are aligned in the same direction, the easy axis being indicated at 33 and the hard axis at 34. Since there is no applied field, the magnetization or domains 32 lie along the easy axis 33.

In order to complete the recorder, wires for the word and digit currents must be provided on the thin magnetic film 31, and make provision for a d.c. bias. This is accomplished as shown in FIGS. 3 and 4.

Figure 3:
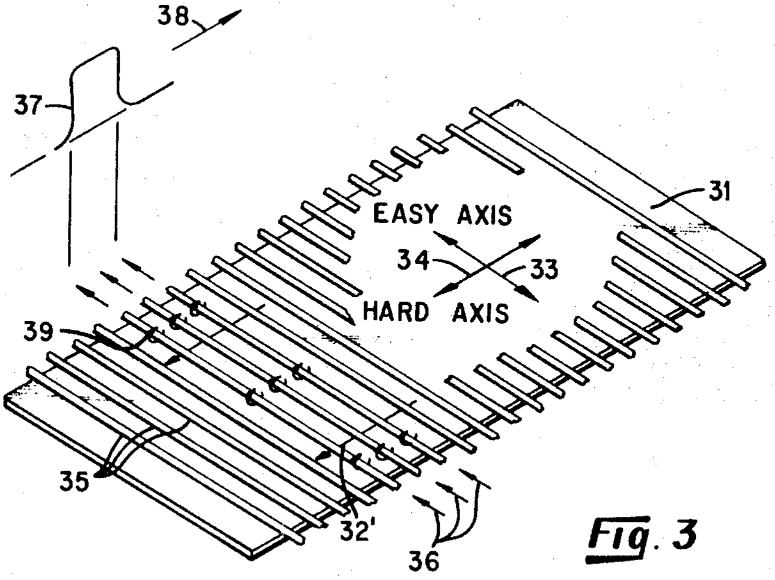

In FIG. 3, a grid of individual wires 35 is placed parallel to one another and to the easy axis 33 and close to the film 31 such that current indicated at 36 in any wire 35 will magnetize the area of the film 31 under that wire 35 along its hard axis 34, the hard axis 34 being the time axis for recording. In order to sweep a narrow column of hard axis magnetization along the film 31 from left to right electronics circuitry is provided to supply currents 36 to the individual wires 35 in time sequence, this current being the "word" current described above, and is accomplished, for example, by the tapped delay line network 14 and time generator 13 in FIG. 1, or from an electronic switching circuit. As this pulse of current indicated at 37 sweeps along the set of wires 35 from left to right as indicated by arrow 38 there is produced a pulse of hard axis fields 39 along the thin film 31 rotating the domains or magnetization 32' to parallel the hard axis 34 as shown. As with a conventional oscilloscope, the speed of the sweep will be set to accommodate the length of signal to be recorded, although provision must be made so that the length of time during which any portion of the film is included in the traveling magnetic field will be long enough to establish full magnetization of that portion along the hard axis, and of course any previous recording will thereby be erased.

Figure 4:
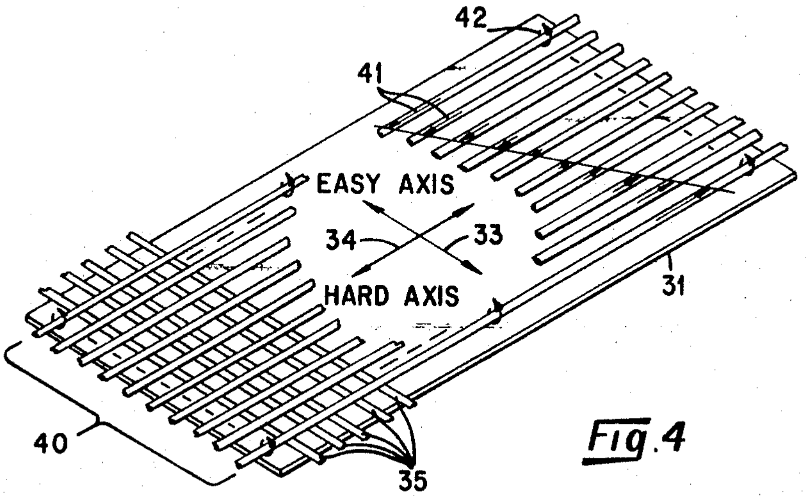

FIG. 4 shows another set or grid of wires 40 positioned on the thin film 31 parallel with hard axis 34 and perpendicular with respect to wires 35 (word lines) and easy axis 33, wires 40 constituting the digit lines. Steady d.c. currents indicated at 41 in wires 40 are arranged to produce an easy axis bias field 42 in the film which increases, in this embodiment, algebraically from a negative value along the upper edge of the film 31, through zero at the center, to an equal positive value at the lower edge of the film, this being illustrated by the current arrows 41 indicating current flow from right to left at the upper edge of film 31, the arrows being reduced in size toward the zero point at the center of the film, whereafter the arrows indicate current flow from left to right and increasing towards the lower edge of the film. The maximum value is enough less than the anisotropy field $H_k$ that the bias field 42 does not interfere with the hard axis magnetization 32' of the film 31 by the sweeping field 39. A baseline can now be recorded. As the trailing edge of the sweeping field 39 passes by, the electron spins are allowed to relax to the easy axis direction, whose sense at any point is determined by the polarity of the bias field 42, be it negative or positive as above described. The film 31 becomes divided into two equal domains, with the boundary wall along the center line of the film. The d.c. bias current 41 determines the signal (digit current) level necessary to change the direction of the easy axis orientation. As described above with respect to the FIG. 1 embodiment, the bias current 41 is different for each bias wire 40 in the grid or matrix.

Figure 5:
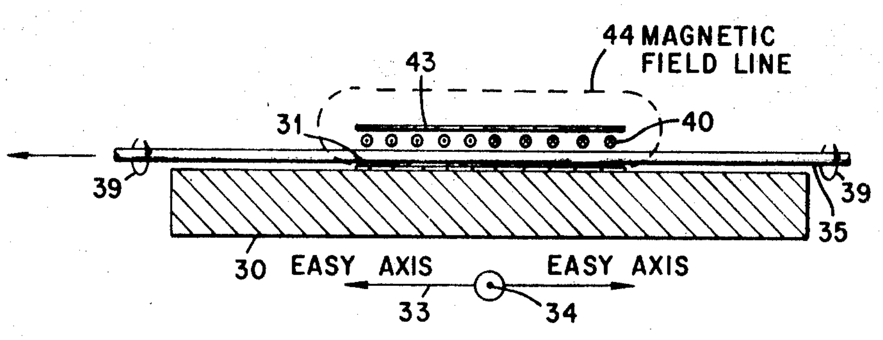

In FIG. 5, which illustrated a cross section of the FIGS. 2–4 matrix, is shown the last element required for recording, a signal current conductor, which in this embodiment constitutes a flat strip 43 positioned over and parallel to bias wires 40 and film 31. A field indicated at 44 due to the current in signal conductor 43 adds algebraically to the bias field 42 such that the boundary wall and domains described now on film 31 are displaced from the center line by an amount corresponding to the amplitude and polarity of the signal in conductor 43. The relaxation time of the electron spins is so short, theoretically perhaps in the vicinity of $10^{-10}$ second, that very fast response time to signal changes is attainable.

Figure 6:
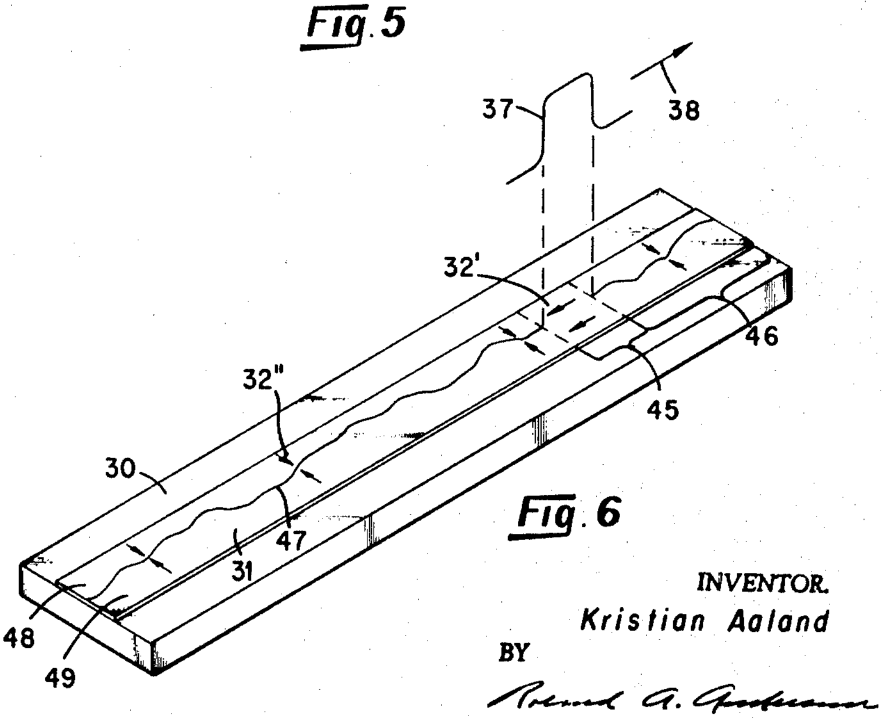

FIG. 6 illustrates what happens in the thin film 31 during the recording of a wave form, the recording being accomplished as hereinafter briefly described: To record on the film 31 the domains or magnetization 32 (see FIG. 2) are rotated to be parallel to the hard axis 34 as shown at 32' by the word current 36 through the first of wires 35 starting at the left end of the film, for example. These domains are then tilted in one direction or the other by the sum of the signal current in conductor 43 and the bias current 41 in bias wires 40. When the word current 36 stops or decays the domains then fall to the easy axis direction determined by the signal and bias currents, these domains being indicated at 32''. As the word current pulse 37 sweeps along the wires 35 as indicated at 38 in FIG. 6, the above procedure is repeated for the domains in the area of the film 31 through which the word current 36 is flowing, with the word current 36 beginning and falling at some preprogrammed time, as by a delay line network or switching means. As shown in FIG. 6, as the area of hard axis magnetization, indicated at 45 sweeps along the film 31 from left to right, the film having a previously recorded waveform on it as indicated at 46, the previous waveform is erased and a new waveform 47 is recorded as a domain boundary leaving two domains or areas of magnetization 48 and 49. As the fall of the word current 36 determines the instant of recording, and the film length is small compared to the signal duration, it is a simple matter to tailor the time base to any experimental requirement. When the word current 36 has been sequentially passed through each of wires 35 from left to right, a signal or waveform 47 represented by changes in the easy axis orientations of the domains 32'' is recorded, thus completing the process.

Although it is possible to read out the location of the boundary wall or wave form 47 by magneto-optical means, it is generally more useful to perform this function electronically. One such electronic technique uses ferro-magnetic resonance absorption by the film at microwave frequencies as low as a few hundred megaHertz. For example, a smaller word current may be used which will rotate the domains off the easy axis, but which is not large enough to cause the domains to switch. When this smaller word current falls, it produces a pulse in each digit line in the column which was excited. The polarity of this pulse tells the easy direction of that domain. Therefore, by interrogating each word line column in sequence, and watching the polarity of the pulse out of the digit line, each intersection on the matrix may be read out, and the recorded signal recovered in a quantized form.

The inventive magnetic matrix recording system can be made on recording cards in the form of a single ribbon, for example, as illustrated in FIGS. 2–6, for use as a planar oscilloscope and has certain advantageous features over the conventional cathode tube oscilloscope, these being as follows:

1. The card and its associated magnetic field-producing sets of transmission lines or grids of wires can be assembled in a flat form, eliminating most of the volume required by a cathode ray tube.
2. The speed of writing has no effect on the intensity of the trace, and therefore, a single sweep at any speed is sufficient to fully capture the waveform onto the card. This makes possible a memory oscilloscope with much greater writing speed than existing instruments possess.
3. The recorded waveform is far more resistant to nuclear radiation than is photographic film, in fact, it is proposed that this type of recording system be used in radiation environments, near the signal sensors, thus reducing or eliminating the need for long cables to carry fast signals to conventional oscilloscopes.
4. The thin magnetic film may be plated on various substrates giving increased ruggedness to the system.

Figure 7:
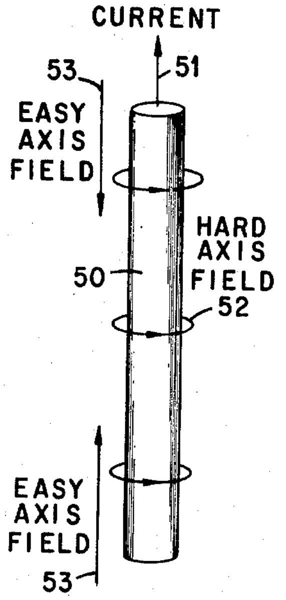
FIGS. 7–9 are partial views illustrating the inventive concept utilizing coil wound plated wires.
Figure 8:
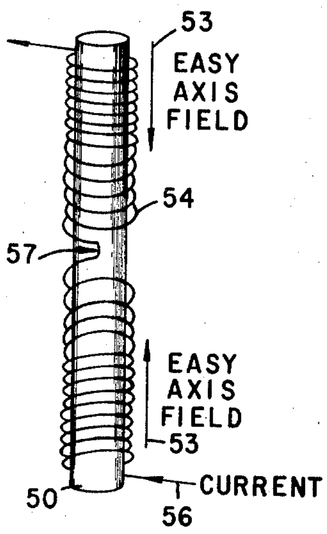
Figure 9:
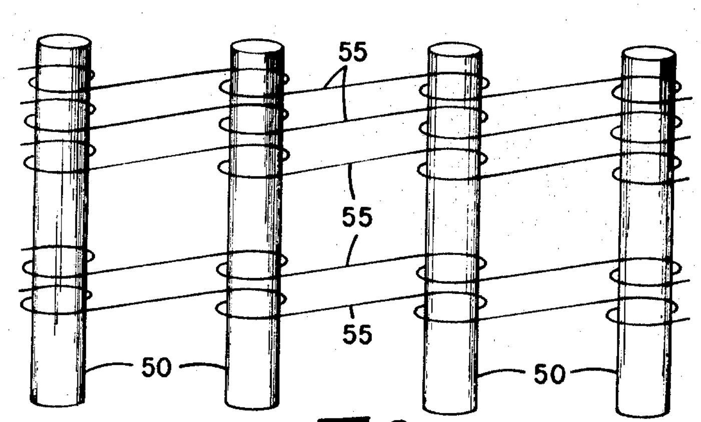

While the above described embodiments of the inventive magnetic matrix recording system utilize recording cards or ribbons, other forms may be effectively utilized such as a planar arrangement of parallel wires, each one plated with a magnetic thin film and wrapped with coils forming the word lines and digit lines as hereafter described with respect to FIGS. 7 to 9. The basic technique of recording a signal sample on a plated wire is known in the art, as exemplified by Bell Telephone Laboratories use thereof in an analog-to-digital binary encoder. In the plated wire embodiment, as in the card or ribbon embodiments, above described, three magnetic fields are used. As illustrated in FIG. 7, a plated wire 50 has a current indicated at 51 directed therethrough to magnetize the film along its hard axis 52, the hard axis being circumferential and the easy axis 53 being parallel to the axis of the wire 50. As shown in FIGS. 8 and 9, sets of coils 54 and 55 wound of the plated wire 50 provide the bias and signal fields, the bias field being created by directing a biasing current, indicated at 56 through the coils 54, while the signal field is created by directing a signal current through the signal coils 55. In the FIG. 8 embodiment of the bias field coil 54, the winding direction is reversed at the center 57 to provide a zero field, as in the FIGS. 2–6 embodiment, and the turns/inch increases linearly with distance from the center position of the coil 54. There should be equal currents in all signal coils 55. In actual practice a bias coil 54 as shown in FIG. 8 would be wound on each of the plated wires 50 in FIG. 9, and the signal coils 55 wrapped around bias coils 54. As described with respect to FIG. 1, biasing means would be attached to bias coils 54 and the time delay network or strobe means would be connected to the plated wires 50, with the signal to be recorded being directed through the signal coils 55.

Figure 10:
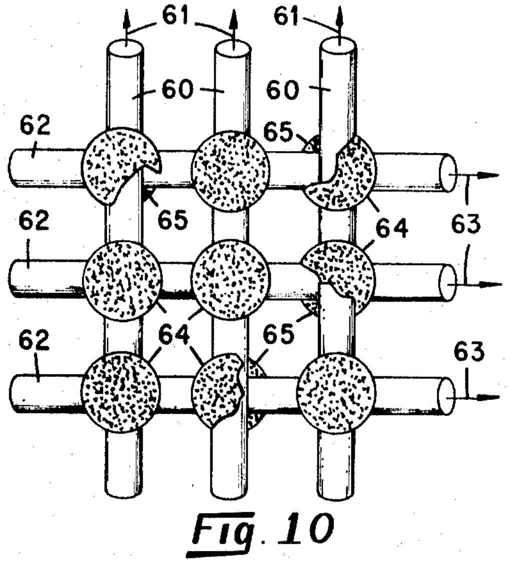
FIG. 10 is a partial view of another embodiment of the inventive recording system, utilizing a coupling effect of the individual areas of magnetic film, with portions being cut away to illustrate the multiple layers of thin magnetic film.

FIG. 10 illustrates a symbolic embodiment of the magnetic matrix in accordance with the invention where a plurality of pairs of small areas or "dots" of magnetic thin film are positioned on opposite sides of a grid of current-carrying wires. As shown, a first set of current-carrying parallel wires 60 form the "word" lines or wires, the currents directed therethrough, as indicated at 61 a in-timed sequence and create a sweeping hard-axis field, the wires 60 being connected to a delay line network or switching means, as in the FIG. 1 embodiment. A second set of current-carrying parallel wires 62 form the "-digit" and "signal" lines or wires, transient signal current indicated at 63 being superimposed on bias currents in the same conductors or wires, the wires 62 being positioned along the easy axis and connected to a biasing means and to a signal input means. The sets of wires 60 and 62 cross over each other and the intersections thereof are interposed between pairs of individual areas or dots of thin magnetic film 64 and 65 which form a coupling effect and the signal trace creates two groups of oppositely magnetized domains with consequence flux closure on the periphery. This embodiment makes for a more immune memory element to outside flux disturbances.

It is thus seen that the present invention provides a magnetic matrix recording system which utilizes the uniaxial isotropy property of magnetic thin films, the waveform of the signal to be recorded being traced out as the boundary wall between two magnetic domains in a single film, or as the dividing line between two groups of domains in plated wires or in arrays of small areas of film. Three magnetic fields are used, a sweeping field creates hard-axis magnetization, and at the trailing edge of the sweeping field, the algebraic sum of the signal field present at that instant, and a static gradient or bias field, determine a neutral point above and below which the magnetization relaxes to opposite easy-axis polarities. Advantages of the inventive recording method include: possibility of planar packaging, signal times from d.c. to nanoseconds, electronic readout and, from these latter two, the extension of memory oscilloscope technology to the nanosecond region.

Figure 11:
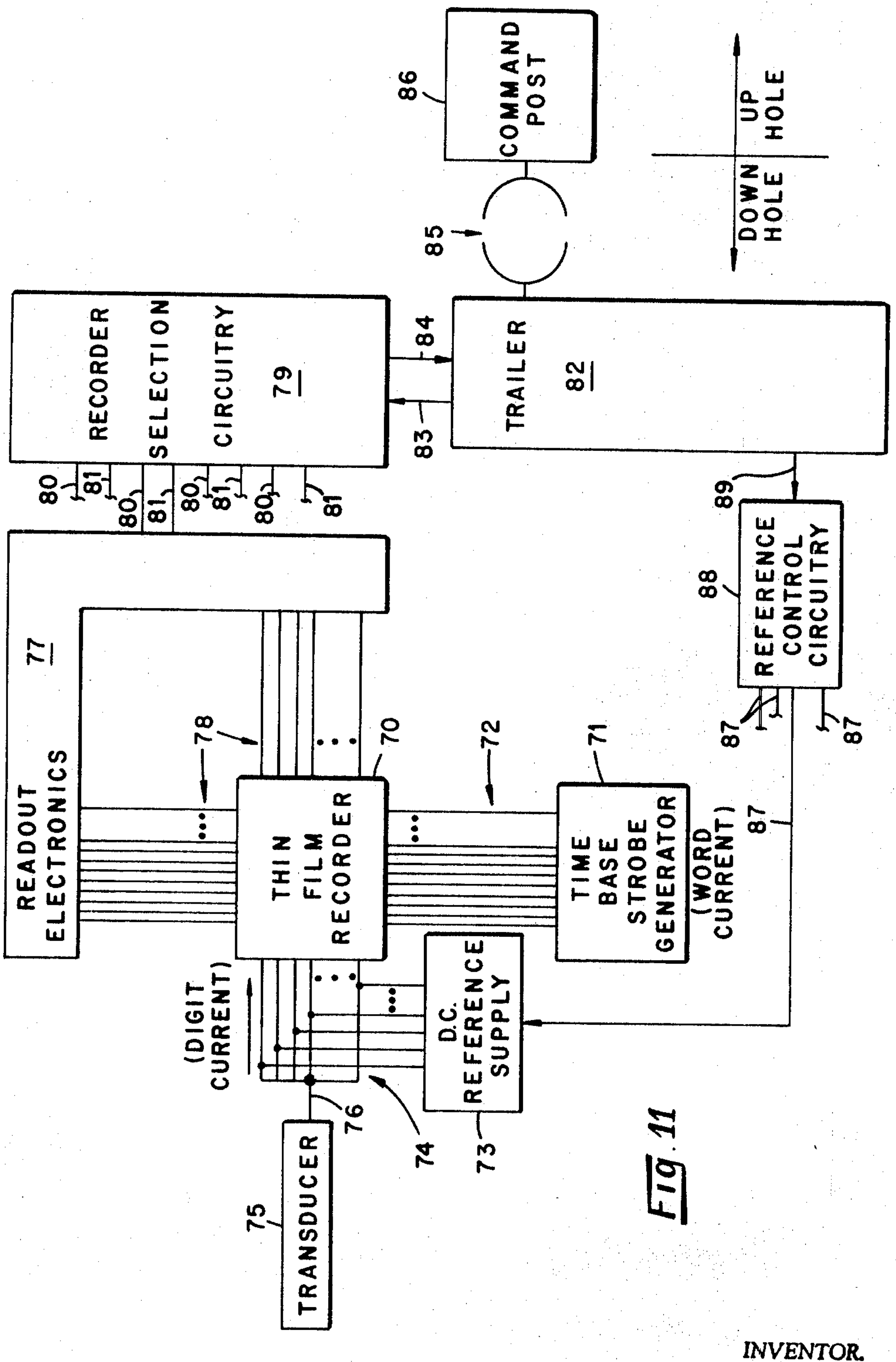
FIG. 11 is a block diagram illustration of an application of the inventive magnetic matrix recording system in a nuclear radiation environment.

To illustrate an application of the invention, reference is made to FIG. 11 which in block diagram shows the inventive system adapted for nuclear radiation environments for recording signals emanating from a nuclear detonation. As shown in FIG. 11, a magnetic thin film recorder 70, which may be constructed in accordance with any of the embodiments described above and illustrated in FIGS. 1–10, is operatively connected to a time base strobe generator 71 via leads or cables indicated at 72, which provides the word current as described above with respect to the time generator and delay line network of FIG. 1 and operatively connected to a d.c. supply 73 via leads or cables indicated at 74, which provides the digit or bias current as described above with respect to the bias means 11 and **12*l*–12*e* of FIG. 1. A particle detector or transducer 75, which detects a desired signal to be recorded transmits such signal via line signal 76 to the digit lines 74 from the reference supply 73, the signal being recorded on recorder 70 as above described. The thin film recorder 70 is operatively connected to readout electronics 77 via cables or leads indicated at 78, readout electronics 77 being connected to recorder selection circuitry 79 via a command signal lead or cable 80 and a data signal lead or cable 81. Recorder selection circuitry 79 is connected to a trailer 82, or other operational station, via a recorder select cable or lead 83 and a serial data cable or lead 84. Trailer 82 is connected via a microwave network indicated at 85 to a command post 86. The d.c. reference supply 73 is connected via a lead or cable 87 to reference control circuitry 88 for remote scale change of the bias currents, if desired, reference control circuitry 88 being connected via a reference control lead or cable 89 to trailer 82. While only one thin film recorder 70 and associated equipment is illustrated, as indicated by the broken leads 80, 81 and 87 from recorder selection circuitry 79 and reference control circuitry 88**, respectively, additional recorders may be utilized, three such additional recorder units being indicated in this embodiment.

Accordingly, it is seen that the inventive recorder may be utilized near a nuclear detonation with the pulse generator, biasing supply, and readout electrons being remotely located and connected thereto by appropriate cables.

It has thus been shown that the present invention provides a magnetic matrix analogue storage recording and system in which an array of thin-film magnetic memories is utilized to record electrical signals as a function of time. In general, one axis of a magnetic matrix card or array of plated wires (i.e., an array of magnetic bit memories) provides a time base wherein each column or word line is sequentially periodically excited. The remaining axis concurrently records in the threshold steps the magnitude of a signal, thereby providing a magnetically stored plot of the signal as a function of time. The novel system may utilize signal recording units of continuous film, strips or a plurality of cards or arrays stacked in parallel or series to provide an extended time and signal amplitude range. The inventive system may be utilized for recording signals generated by particle detectors during a nuclear detonation, the associated equipment therefor being remotely located with respect to the recorder assembly. In general, the present invention provides a rugged, reliable recording system with a response time comparable with or greater than an oscilloscope, but significantly simpler and more economical. Furthermore, the magnetic memory or the inventive system permanently stores recorded information, thereby providing a versatile system in terms of physical handling of the memory units and recovery of information.

While particular embodiments of the invention have been illustrated and described, modifications will become apparent to those skilled in the art, and it is intended to cover in the appended claims all such modifications as come within the spirit and scope of the invention.

What I claim is:

1. A magnetic matrix recording system for recording electrical signals as a function of time comprising: an array of magnetic memory elements; each memory element having a word line and a digit line intersecting thereon; means for current biasing each digit line in consecutively increasing amounts; means for sequentially current-pulsing each word line in a consecutive order; and means for applying an input signal to at least one of said digit lines; whereby those memory elements which receive in their intersecting digit and word lines sufficient switching current, consisting of both said biasing current and current provided by said signal, and a pulsing current, switch state upon decay of the pulsing current causing a permanent record of the electrical signal at those memory elements.

2. The recording system defined in claim 1, wherein said array of magnetic memory elements are supported on a substrate, and wherein said intersecting word lines and digit lines form a grid with said word lines being substantially perpendicular to said digit lines.

3. The recording system defined in claim 1, wherein said current biasing means includes a biasing power source and a plurality of bias impedance means, one of said bias impedance means being connected to an associated one of said digit lines.

4. The recording system defined in claim 1, wherein said current-pulsing means includes a time base generator means and a delay line network, said delay line network being attached to each of said word lines.

5. The recording system defined in claim 1, wherein said signal input means is connected to one of said digit lines, and wherein each of said digit lines are connected in series.

6. The recording system defined in claim 1, wherein said signal input means comprises a flat strip positioned parallel to said magnetic memory elements.

7. The recording system defined in claim 1, wherein said memory elements are constructed from a continuous thin magnetic film supported on a substrate, wherein said word lines consist of a plurality of parallel electrically conductive wires positioned perpendicular to the longitudinal axis of said magnetic film, wherein said digit lines consist of a plurality of parallel electrically conductive wires positioned perpendicular to said first mentioned parallel wires, and wherein said input signal means consists of a flat electrically conductive strip positioned parallel to the longitudinal axis of said magnetic film.

8. The recording system defined in claim 1, wherein said array of magnetic memory elements comprises a plurality of electrically conductive wires plated with magnetic thin film, wherein said word lines are constituted by said plated wires, wherein said digit lines consist of electrically conductive coils each wrapped about one said plated wires and wherein said input signal means consists of a plurality electrically conductive coil means wrapped around each of said plated wires.

9. The recording system defined in claim 1, wherein said array of magnetic memory elements constitute a plurality of pairs of small individual areas of thin magnetic film, and where each of said intersections of said word lines and said digit lines is positioned intermediate one of said pairs of individual areas of magnetic film.

10. The recording system defined in claim 1, in combination with an electronic readout means operatively connected to said array of magnetic memory elements, recorder selection circuitry operatively connected to said readout means, reference control circuitry operatively connected to said current biasing means, and means for controlling said reference control circuitry and said recorder selection circuitry and for receiving data from said recorder selection circuitry.

* * * * *